(12) United States Patent
Chen

(10) Patent No.: US 7,327,121 B2
(45) Date of Patent: Feb. 5, 2008

(54) CHARGER HAVING OUTPUT VOLTAGE REGULATING FUNCTION

(75) Inventor: Yao-Ti Chen, Taichung (TW)

(73) Assignee: Goodti Industrial Co., Ltd., Taichung (TW)

( * ) Notice: Subject to any disclaimer, the term of this patent is extended or adjusted under 35 U.S.C. 154(b) by 74 days.

(21) Appl. No.: 11/433,339

(22) Filed: May 12, 2006

(65) Prior Publication Data

US 2007/0262747 A1 Nov. 15, 2007

(51) Int. Cl.
*H01M 10/46* (2006.01)
(52) U.S. Cl. ..................................... 320/141
(58) Field of Classification Search ............. 320/107, 320/137, 141, 145
See application file for complete search history.

(56) References Cited

U.S. PATENT DOCUMENTS 5,192,905 A * 3/1993 Karlin et al. ............... 320/145
5,289,045 A * 2/1994 Lavin et al. ................. 307/64
5,352,969 A * 10/1994 Gilmore et al. ............. 320/160
6,664,762 B2 * 12/2003 Kutkut ........................ 320/116

* cited by examiner

*Primary Examiner*—Edward H Tso
(74) *Attorney, Agent, or Firm*—Alan Kamrath; Kamrath & Associates PA

(57) ABSTRACT

A charger for a motorized tool includes a filter circuit, a rectifier circuit, a pulse width modulation (PWN) circuit, a transformer circuit, and a sensing circuit. Thus, the sensing circuit captures partial of the output voltage to compare with a reference voltage to obtain an error signal between the output voltage and the reference voltage and feeds back the error signal to the PWN circuit to change the pulse width of the PWN circuit so as to regulate the duty cycle of the power switch, so that the output voltage and current are adjusted according to the feedback error signal so as to charge the battery exactly and stably.

11 Claims, 4 Drawing Sheets

CHARGER HAVING OUTPUT VOLTAGE REGULATING FUNCTION

BACKGROUND OF THE INVENTION

1. Field of the Invention

The present invention relates to a charger and, more particularly, to a charger for a motorized tool, such as a motorized drill, screwdriver and the like.

2. Description of the Related Art

A conventional charger for a motorized tool in accordance with the prior art shown in FIG. 4 is connected between a mains supply 1 and a battery 8 and comprises a rectifier circuit 2a connected to the mains supply 1 to convert the alternating current voltage into a direct current voltage which functions as an input voltage, a pulse width modulation (PWN) circuit 3a connected to the rectifier circuit 2a to control a pulse width by the input voltage from the rectifier circuit 2a, and a transformer circuit 4a connected to the PWN circuit 3a and including a primary winding so that the input voltage is supplied to the primary winding of the transformer circuit 4a to gradually increase and store an energy in the primary winding of the transformer circuit 4a to produce an output voltage for charging the battery 8. However, the charging process is easily interrupted by impurities, thereby decreasing the voltage, elongating the charging time, and causing loss of the power. In addition, the charger is only used to charge the battery of a determined specification, thereby limiting the versatility of the charger.

BRIEF SUMMARY OF THE INVENTION

In accordance with the present invention, there is provided a charger, comprising a filter circuit connected to an input terminal to filter and capture an alternating current voltage from the input terminal, a rectifier circuit connected to the filter circuit to convert the alternating current voltage into a direct current voltage which functions as an input voltage, a pulse width modulation (PWN) circuit connected to the rectifier circuit to control a pulse width by the input voltage from the rectifier circuit, a transformer circuit including a primary winding connected to the PWN circuit so that the input voltage is supplied to the primary winding of the transformer circuit to gradually increase and store an energy in the primary winding of the transformer circuit to produce an output voltage for charging a battery, and a sensing circuit for capturing partial of the output voltage and outputting a signal to the PWN circuit to regulate the pulse width of the PWN circuit so as to control a duty cycle of a power switch.

The primary objective of the present invention is to provide a charger having an output voltage regulating function.

Another objective of the present invention is to provide a charger, wherein the sensing circuit captures partial of the output voltage to compare with a reference voltage to obtain an error signal between the output voltage and the reference voltage and feeds back the error signal to the PWN circuit to change the pulse width of the PWN circuit so as to regulate the duty cycle of the power switch, so that the output voltage and current are adjusted according to the feedback error signal so as to charge the battery exactly and stably, thereby stabilizing the charging process, and thereby reducing loss of the power.

A further objective of the present invention is to provide a charger, wherein the sensing circuit controls the duty cycle of the power switch by changing the pulse width of the PWN circuit so that the secondary winding of the transformer circuit can supply output voltages of determined values according to the specification of the battery so as to charge batteries of different specifications.

A further objective of the present invention is to provide a charger, wherein the charger control unit can control the charging time of the output voltage for charging the battery and the output current value passing through the battery according to specification and saturated capacity of the battery to prevent the battery from being charged excessively so as to protect the battery.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
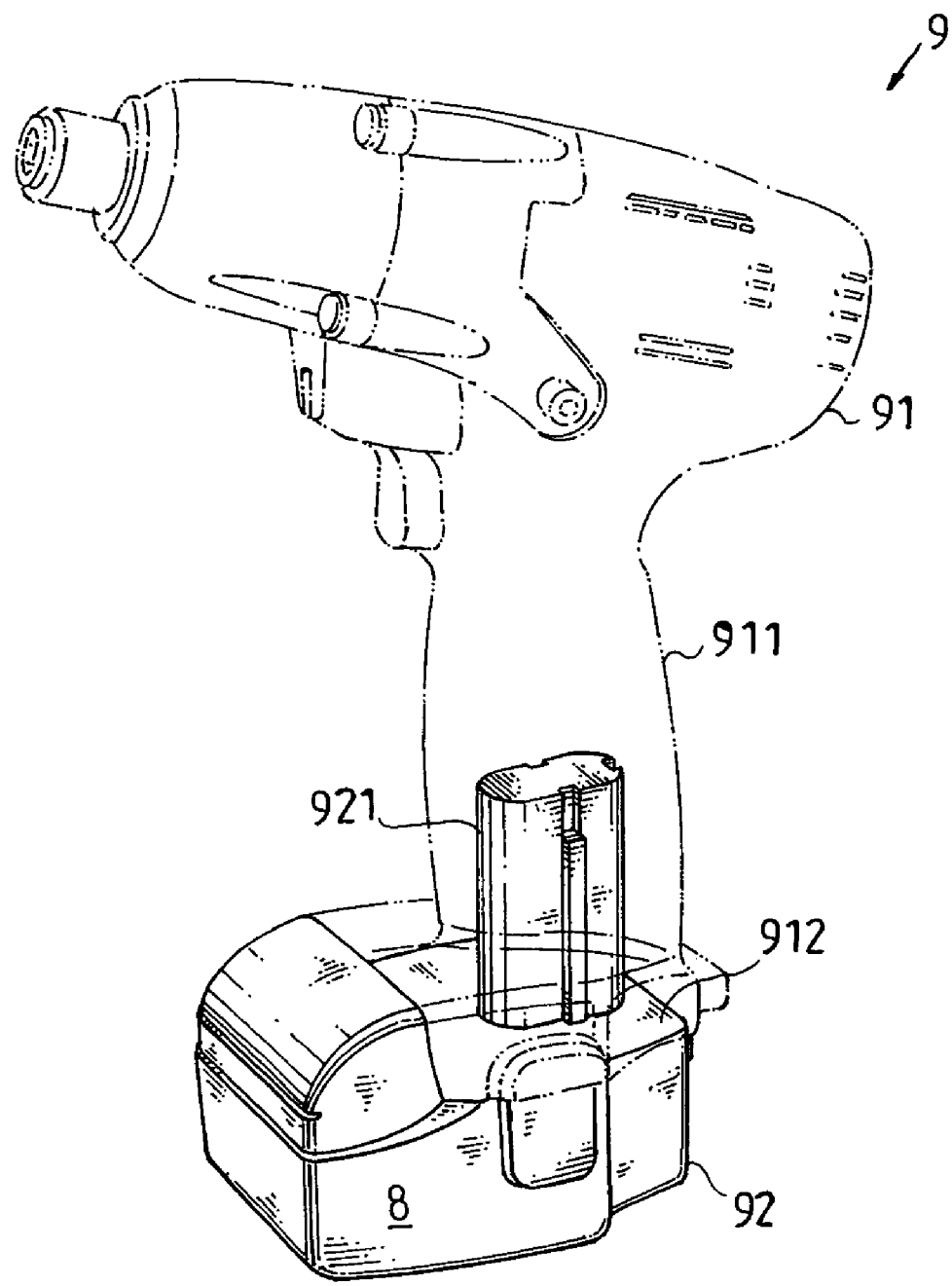
FIG. 1 is a perspective view of a motorized tool in accordance with the preferred embodiment of the present invention.

Referring to the drawings and initially to FIG. 1, a hand-held motorized tool 9 comprises a tool body 91 having a grip portion 911 having a bottom formed with an opening 912, a base 92 mounted on the grip portion 911 of the tool body 91 and having a plug 921 inserted into the opening 912 of the grip portion 911, and a chargeable battery 8 mounted on the base 92.

Figure 2:
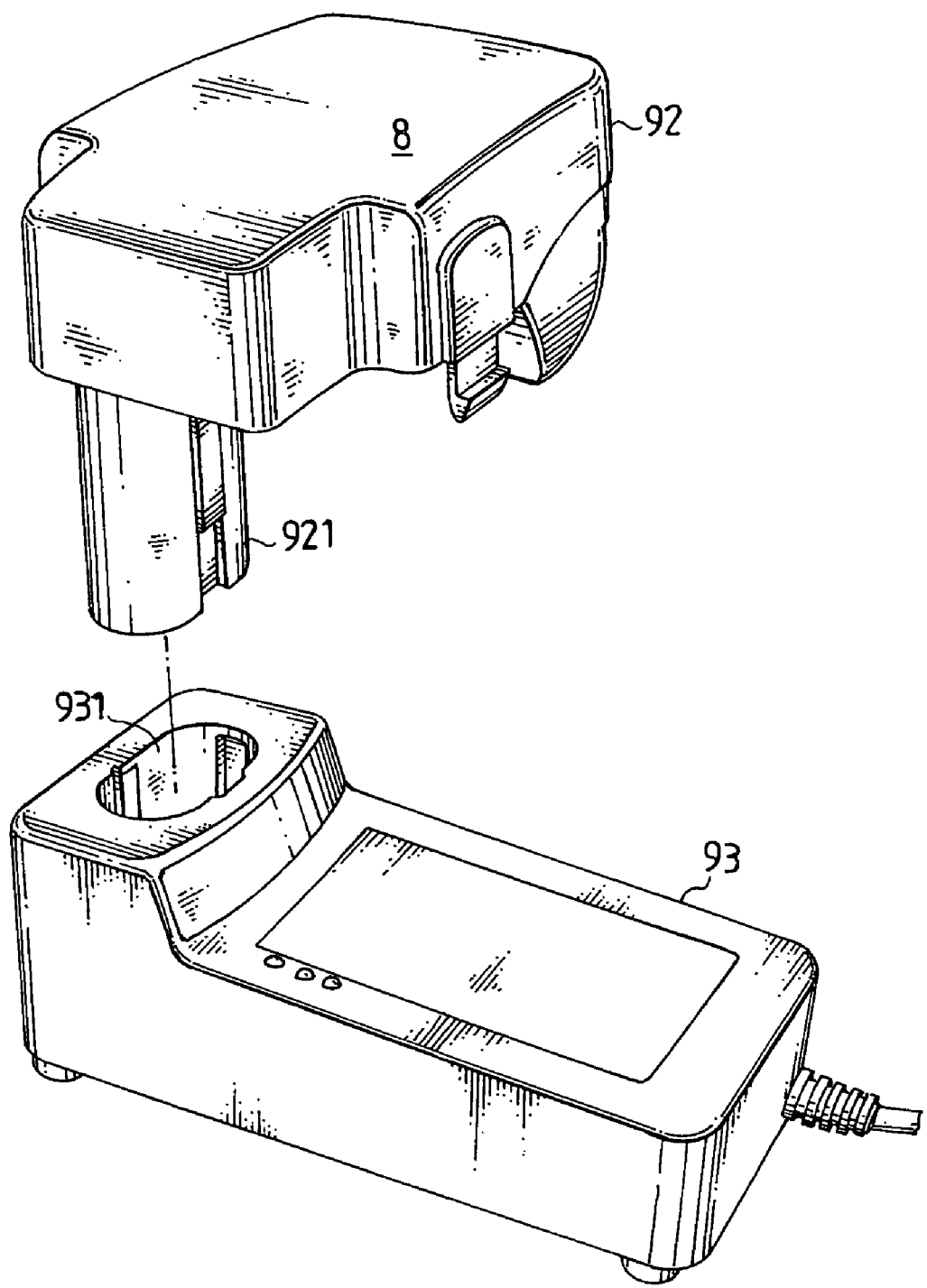
FIG. 2 is a perspective view of a charger in accordance with the preferred embodiment of the present invention.

Referring to FIG. 2, after the plug 921 of the base 92 is detached from the opening 912 of the grip portion 911, the plug 921 of the base 92 is inserted into a slot 931 of a charger 93 so that the charger 93 is electrically connected to the battery 8 to charge the battery 8.

Figure 3:
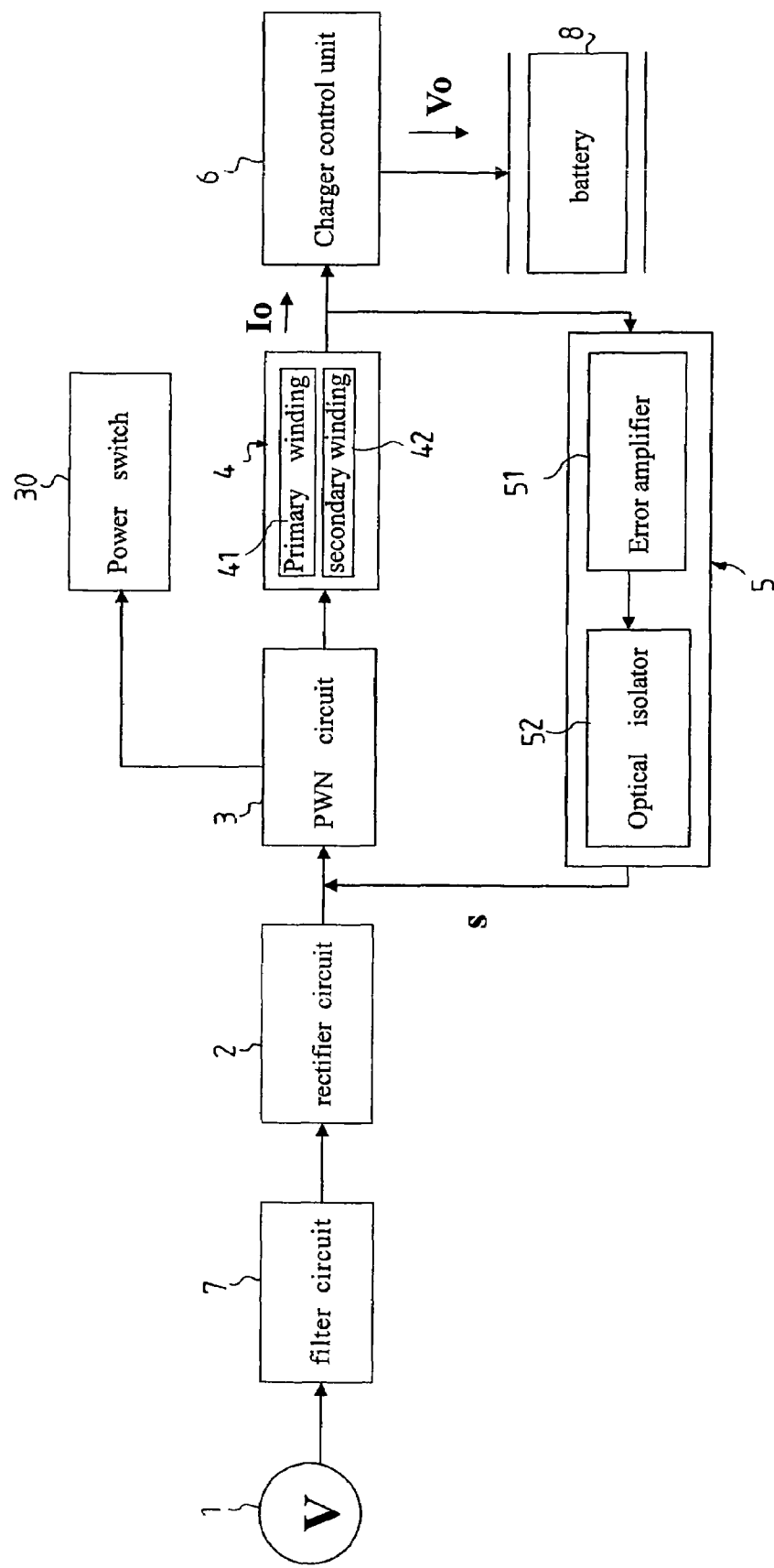
FIG. 3 is a circuit layout of the charger as shown in FIG. 2.
Figure 4:
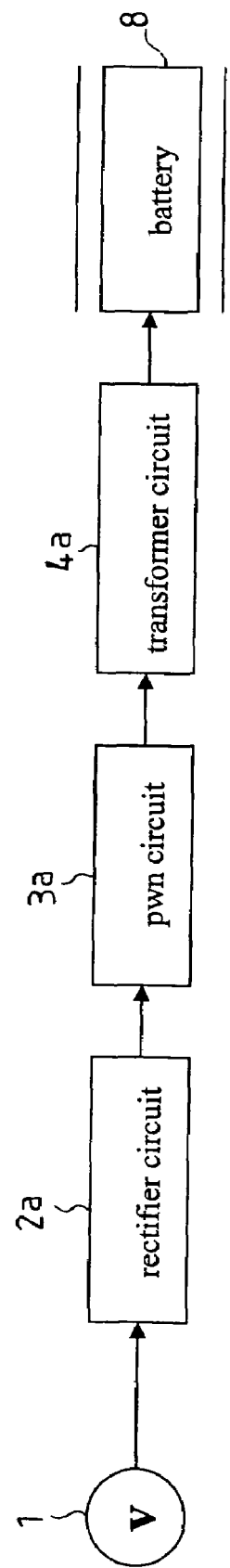
FIG. 4 is a circuit layout of a conventional charger in accordance with the prior art.

Referring to FIG. 3, the charger 93 in accordance with the preferred embodiment of the present invention is connected between a mains supply 1 and the battery 8 and comprises a filter circuit 7 connected to an input terminal of the mains supply 1 to filter and capture an alternating current voltage from the input terminal, a rectifier circuit 2 connected to the filter circuit 7 to convert the alternating current voltage into a direct current voltage which functions as an input voltage, a pulse width modulation (PWN) circuit 3 connected to the rectifier circuit 2 to control a pulse width by the input voltage from the rectifier circuit 2, a transformer circuit 4 including a primary winding 41 connected to the PWN circuit 3 so that the input voltage is supplied to the primary winding 41 of the transformer circuit 4 to gradually increase and store an energy in the primary winding 41 of the transformer circuit 4 to produce an output voltage for charging the battery 8, a sensing circuit 5 for capturing partial of the output voltage and outputting a signal to the PWN circuit 3 to regulate the pulse width of the PWN circuit 3 so as to control a duty cycle of a power switch 30, and a charger control unit 6 to control a charging time of the output voltage for charging the battery 8 and a current value passing through the battery 8 according to specification and saturated capacity of the battery 8.

The alternating current voltage filtered by the filter circuit 7 is maintained at a determined frequency.

The PWN circuit 3 receives the signal from the sensing circuit 5 to modulate the pulse width thereof. The PWN circuit 3 receives the signal to modulate the pulse width to control on/off operation of the power switch 30. Preferably, the power switch 30 is a transistor.

The transformer circuit 4 further includes a secondary winding 42.

The sensing circuit 5 has a first terminal connected between the rectifier circuit 2 and the PWN circuit 3 and a second terminal connected between the transformer circuit 4 and the charger control unit 6. The sensing circuit 5 includes an error amplifier 51 and an optical isolator 52. The sensing circuit 5 controls the duty cycle of the power switch 30 by changing the pulse width of the PWN circuit 3 so that the secondary winding 42 of the transformer circuit 4 outputs the output voltage exactly so as to charge the battery 8. On the other hand, the error amplifier 51 of the sensing circuit 5 captures partial of the output voltage to compare with a reference voltage to obtain an error signal between the output voltage and the reference voltage and feeds back the error signal to the PWN circuit 3 to change the pulse width of the PWN circuit 3 so as to regulate the duty cycle of the power switch 30. In addition, the optical isolator 52 of the sensing circuit 5 can isolate the PWN circuit 3 to prevent the PWN circuit 3 from being broken by an overflow voltage and can aid communication of feedback of the error signal.

The charger control unit 6 is connected between the transformer circuit 4 and the battery 8 to prevent the battery 8 from being charged excessively so as to protect the battery 8.

In the preferred embodiment of the present invention, the primary winding 41 of the transformer circuit 4 produces an output current 10 and an output voltage $V_o$. Thus, the error amplifier 51 of the sensing circuit 5 captures partial of the output voltage $V_o$ to compare with a reference voltage to obtain an error signal S between the output voltage $V_o$ and the reference voltage and feeds back the error signal S to the PWN circuit 3 to change the pulse width of the PWN circuit 3 so as to regulate the duty cycle of the power switch 30.

Accordingly, the charger has an output voltage regulating function. In addition, the sensing circuit 5 captures partial of the output voltage to compare with a reference voltage to obtain an error signal between the output voltage and the reference voltage and feeds back the error signal to the PWN circuit 3 to change the pulse width of the PWN circuit 3 so as to regulate the duty cycle of the power switch 30, so that the output voltage and current are adjusted according to the feedback error signal so as to charge the battery 8 exactly and stably, thereby stabilizing the charging process, and thereby reducing loss of the power. Further, the sensing circuit 5 controls the duty cycle of the power switch 30 by changing the pulse width of the PWN circuit 3 so that the secondary winding 42 of the transformer circuit 4 can supply output voltages of determined values according to the specification of the battery 8 so as to charge batteries 8 of different specifications. Further, the charger control unit 6 can control the charging time of the output voltage for charging the battery 8 and the output current value passing through the battery 8 according to specification and saturated capacity of the battery 8 to prevent the battery 8 from being charged excessively so as to protect the battery 8.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A charger, comprising:
   a filter circuit connected to an input terminal to filter and capture an alternating current voltage from the input terminal;
   a rectifier circuit connected to the filter circuit to convert the alternating current voltage into a direct current voltage which functions as an input voltage;
   a pulse width modulation (PWN) circuit connected to the rectifier circuit to control a pulse width by the input voltage from the rectifier circuit;
   a transformer circuit including a primary winding connected to the PWN circuit so that the input voltage is supplied to the primary winding of the transformer circuit to gradually increase and store an energy in the primary winding of the transformer circuit to produce an output voltage for charging a battery;
   a sensing circuit for capturing partial of the output voltage and outputting a signal to the PWN circuit to regulate the pulse width of the PWN circuit so as to control a duty cycle of a power switch.

2. The charger in accordance with claim 1, wherein the sensing circuit includes an error amplifier that captures partial of the output voltage to compare with a reference voltage to obtain an error signal between the output voltage and the reference voltage and feeds back the error signal to the PWN circuit to change the pulse width of the PWN circuit so as to regulate the duty cycle of the power switch.

3. The charger in accordance with claim 2, wherein the sensing circuit further includes an optical isolator that can isolate the PWN circuit to prevent the PWN circuit from being broken by an overflow voltage and can aid communication of feedback of the error signal.

4. The charger in accordance with claim 1, further comprising a charger control unit to control a charging time of the output voltage for charging the battery and a current value passing through the battery according to specification and saturated capacity of the battery.

5. The charger in accordance with claim 1, wherein the alternating current voltage filtered by the filter circuit is maintained at a determined frequency.

6. The charger in accordance with claim 1, wherein the PWN circuit receives the signal from the sensing circuit to modulate the pulse width thereof.

7. The charger in accordance with claim 1, wherein the PWN circuit receives the signal to modulate the pulse width to control on/off operation of the power switch.

8. The charger in accordance with claim 4, wherein the sensing circuit has a first terminal connected between the rectifier circuit and the PWN circuit and a second terminal connected between the transformer circuit and the charger control unit.

9. The charger in accordance with claim 1, wherein the transformer circuit further includes a secondary winding.

10. The charger in accordance with claim 9, wherein the sensing circuit controls the duty cycle of the power switch by changing the pulse width of the PWN circuit so that the secondary winding of the transformer circuit outputs the output voltage exactly so as to charge the battery.

11. The charger in accordance with claim 4, wherein the charger control unit is connected between the transformer circuit and the battery to prevent the battery from being charged excessively so as to protect the battery.

* * * * *